United States Patent [19]

Fischer

[11] Patent Number: 5,031,709
[45] Date of Patent: Jul. 16, 1991

[54] DRILLING APPARATUS FOR PRODUCING DRILLED HOLES HAVING AN UNDERCUT

[75] Inventor: Artur Fischer, Waldachtal 3/Tumlingen, Fed. Rep. of Germany

[73] Assignee: fischerwerke Artur Fischer GmbH & Co. KG, Waldachtal, Fed. Rep. of Germany

[21] Appl. No.: 400,468

[22] Filed: Aug. 28, 1989

[30] Foreign Application Priority Data

Aug. 26, 1988 [DE] Fed. Rep. of Germany ....... 3828982

[51] Int. Cl.⁵ ............................................. E21B 17/10
[52] U.S. Cl. ...................................... 175/325; 408/80; 408/202
[58] Field of Search ................ 408/81, 80, 83, 202, 408/241 S, 241 B, 72 B, 14, 230; 409/179, 199; 175/325, 408, 220, 209, 211; 82/1.4, 1.5

[56] References Cited

U.S. PATENT DOCUMENTS

| 790,330 | 5/1905 | Terry | 175/325 |
| 4,010,807 | 3/1977 | Fisher | 408/83 X |
| 4,039,266 | 8/1977 | O'Connell | 408/241 S X |
| 4,111,270 | 9/1978 | Fisher et al. | 175/325 X |

FOREIGN PATENT DOCUMENTS

| 171830 | 2/1986 | European Pat. Off. | 408/202 |
| 2657000 | 6/1978 | Fed. Rep. of Germany | 408/202 |
| 8006868 | 8/1981 | Fed. Rep. of Germany . | |
| 3014388 | 10/1981 | Fed. Rep. of Germany . | |
| 8221158 | 2/1983 | Fed. Rep. of Germany . | |
| 3340090 | 5/1985 | Fed. Rep. of Germany . | |

Primary Examiner—Larry I. Schwartz
Assistant Examiner—Robert S. Schultz
Attorney, Agent, or Firm—Michael J. Striker

[57] ABSTRACT

A drilling apparatus for producing undercut drilled holes and comprising a drill shaft including a bulge portion located between a stop ring mounted on the drill shaft and a drilling head mounted at the free end of the drill shaft, and which narrows towards opposite ends of the drill shaft.

10 Claims, 2 Drawing Sheets

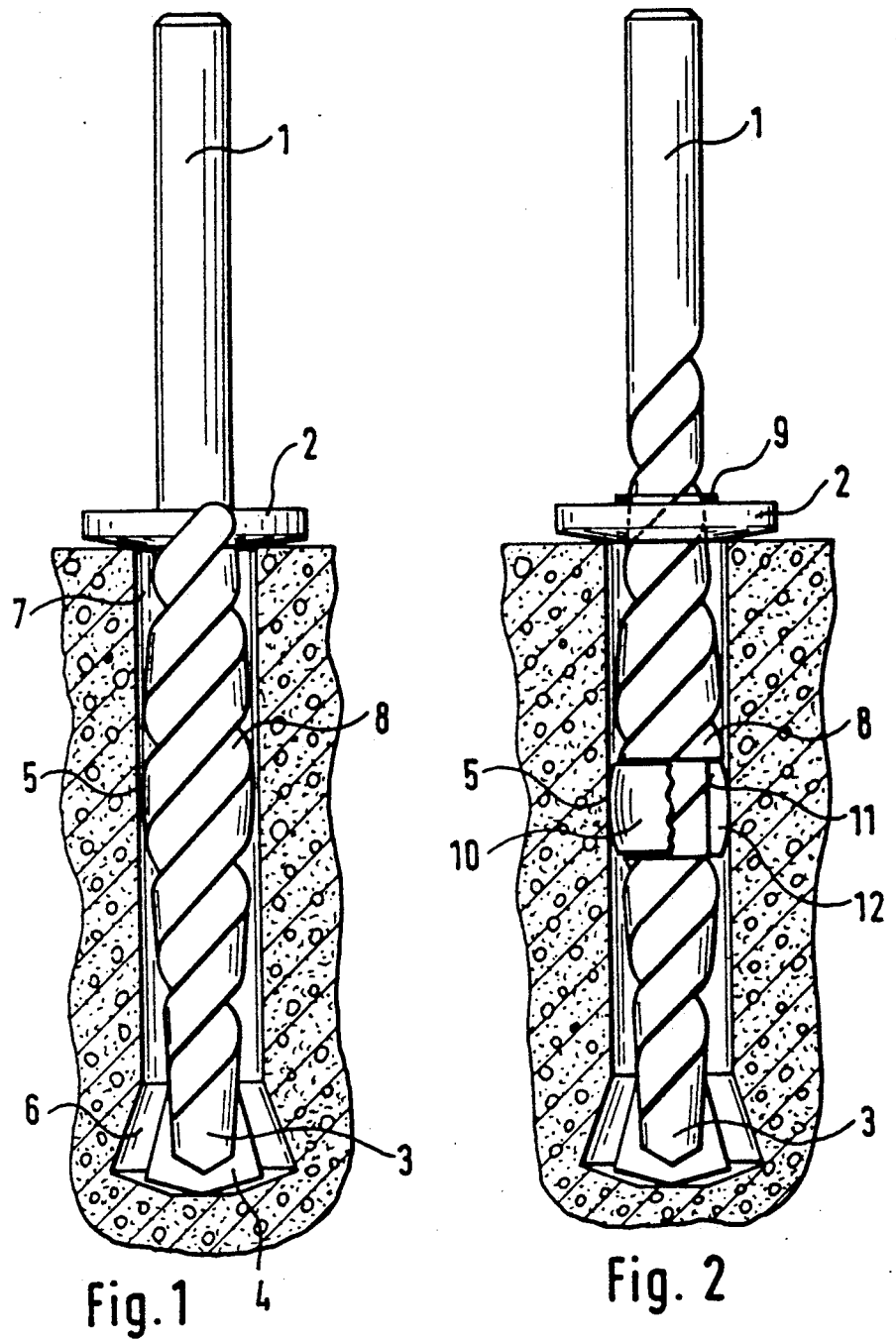

DRILLING APPARATUS FOR PRODUCING DRILLED HOLES HAVING AN UNDERCUT

BACKGROUND OF THE INVENTION

The invention relates to a drilling apparatus comprising a drilling tool receivable in a drilling machine and having a drill shaft, and a drilling head with a drilling plate located at the free end of the drill shaft of the drilling tool.

A drilling apparatus for producing drilled holes provided in the base region with an undercut, is known. The undercut is produced due to pivotal movement of a drill with a broadened drilling head. An expansible plug having an expansible portion that positively engages the undercut can then be inserted into such a drilled hole.

DE-OS No. 33 40 090 discloses a drilling apparatus for producing a drilled hole having an undercut. The drill shaft in this known drilling apparatus is guided in a sleeve with a relatively large amount of play, and the drill shaft can be pivoted inside the sleeve. This has the disadvantage, however, that the drill tool is deflected during the drilling operation, especially when it meets iron rods or other particularly hard components. The deflection of the drill tool can produce distortions in the drilled hole. A particular disadvantage consists in that the drill shaft itself does not form a pivot axis.

SUMMARY OF THE INVENTION

The object of the invention is a simple drilling apparatus for producing undercut drilled holes.

This problem of the invention is solved by providing in a drilling apparatus of the generic type mentioned above a stop ring in a form of a disc mounted on the drilling tool shaft, and a bulge portion in the region between the stop ring and the drilling head which bulge portion narrows toward the drilling head and the stop ring. The bulge portion formed on the drill shaft in the region between the stop ring and the drilling head, enables the drill shaft itself to be used as a pivot bearing during the drilling operation. The stop ring mounted on the drill shaft and having a form of an annular disc, limits the pivotal movements executed during the drilling operation, and also prevents the mouth of the drilled hole from being widened and broken up by the pivotal movements made. The stop ring can be mounted on the drill shaft or can form a one-piece member with the drill shaft.

In a preferred embodiment of the drilling apparatus according to the invention, grooves for drilling dust are formed in the drill shaft. The drilling dust grooves pass through the stop ring mounted on the drill shaft. This ensures that drilling dust removable from the drilled hole through the drilling dust grooves, can pass the stop ring and be evacuated away beyond it.

A ring spring for securing the stop ring on the drill shaft can be mounted above the stop ring on the drill shaft.

In the case where the stop ring is rigidly connected to the drill shaft, the drilling dust grooves end in the stop ring.

In an especially advantageous embodiment of the invention, the drill shaft has, in the central region of its bulge portion, a portion of reduced diameter on which a bearing ring surrounding the drill shaft, is mounted. The bearing ring located on the portion of reduced diameter of the drill shaft, protects the drill shaft, which it surrounds in this region, from excessive wear. A greater degree of wear in comparison with the remainder of the drill shaft would occur in the region of the drill shaft that is of increased diameter because it is subject to more stress than the remaining regions of the drill shaft as a result of the pivotal movements which occur during the drilling operation.

Because the narrowing of the bulge portion in the region of the bearing ring is not great enough to completely interrupt the drilling dust grooves extending along the drill shaft, it is ensured that the bearing ring resting against the drill shaft, does not block the further guiding of the drilling dust through the drilling dust grooves.

The bearing ring is replaced upon being worn. By tempering the drill shaft and the bearing ring together, a stable connection of the bearing ring with the drill shaft is obtained. Once the bearing ring has become worn as a result of the pivotal movements executed during the drilling operations, it is removed and replaced by a new one. This results in advantageous cost-saving, because the replacement of the whole drill shaft because of only localized excessive wear is avoided.

A split sleeve mounted to be movable about the drill shaft, is a centering sleeve. The sleeve allows precise centering during the pivotal movements executed during the drilling operation. The sleeve is prevented from sliding away over the drill shaft in the direction towards the drilling head by a shoulder formed on the drill shaft. A convex collar formed on the drill shaft ensures that the sleeve is retained from sliding in the opposite direction. Since drilling dust grooves pass through both the shoulder on the drill shaft and the convex collar, the removal of the drilling dust is not hindered. The split design of the sleeve allows it to be replaced easily, which also contributes to cost-saving in respect of parts subjected to increased wear. Because the shaft shoulder has a diameter equal to the shaft diameter in the direction towards the drilling head, the pivotal movements executed during the drilling operation are easier to make.

The drill shaft of the drilling apparatus according to the invention can be made without the drilling dust grooves. In that case, the removal of the drilling dust would be ensured by a suction channel known per se extending through the drill shaft.

The invention itself both as to its construction so to its mode of operation, together with additional objects and advantages thereof, will be best understood from the following description of the preferred embodiments with reference to the appended drawings.

BRIEF DESCRIPTION OF THE DRAWINGS

FIG. 1 shows a general view of a drilling apparatus according to the invention in a drilled hole having an undercut;

FIG. 2 shows a partially sectional view of the drilling apparatus according to the invention.

DESCRIPTION OF THE PREFERRED EMBODIMENTS

Figure 3:
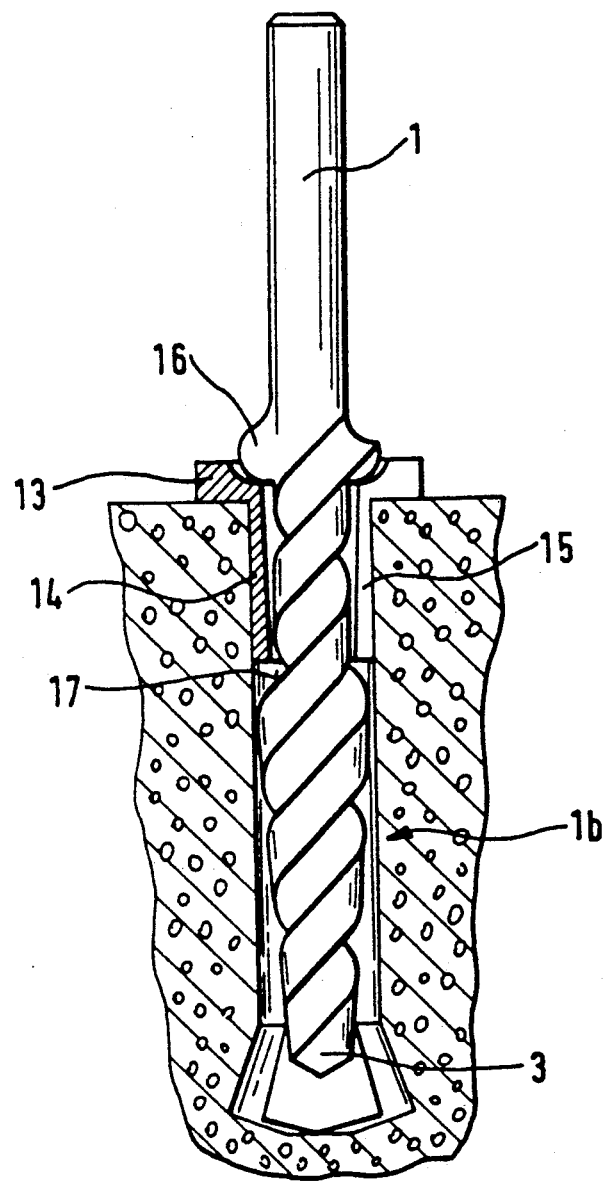
FIG. 3 shows a partially sectional view of another embodiment of a drilling apparatus according to the invention.

FIG. 1 shows drilling apparatus comprising a drill shaft 1 and a stop ring 2 arranged rigidly thereon. A drilling plate 4 the lateral blades of which project at an angle from the drill shaft 1 is inserted into the drilling head 3. Between the drilling head 3 and the stop ring 2 the drill shaft 1 has a bulge portion 5 which serves as a pivot bearing during forming of an undercut 6. The bulge portion 5 rests against the wall of the drilled hole 7 and has a cylindrical shape in the region of its contact with the wall. The pivot region is limited by the shape of the bulge portion 5. It is thus possible to produce predetermined undercuts 6 at the base of the drilled holes.

The stop ring 2 is rigidly secured to the shaft 1 by pressing or by some other means and limits the depth to which the drilling head 3 is able to penetrate.

In order to evacuate drilling dust produced in the course of the drilling operation out of the drilled hole 7, the drill shaft 1 has grooves 8 for drilling dust which extend from the drilling head 3 along the bulge portion 5 and through the stop ring 2 to the straight portion of the shaft. The drilling dust can thus be ecavuated through the annular opening of the stop ring 2.

FIG. 2 shows a further embodiment of a drilling apparatus according to the invention in which the stop ring 2 is secured by a ring spring 9 which engages an annular groove in the shaft 1. The stop ring 2 can thus be exchanged without difficulty once the ring spring 9 has been removed.

In the embodiment shown in FIG. 2, a further part that is intended to take the wear, in the form of a bearing ring 10, is provided on the widest portion of the bulge portion 5. The bearing ring has a smooth rounded surface that matches the shape of the bulge portion 5. The bearing ring 10 surrounds the drill shaft 1 at a recess or at a portion 11 of reduced diameter which has a lesser depth than the drilling dust grooves 8. The drilling dust grooves 8 thus extend also underneath the bearing ring 10 in order that drilling dust produced in the region of the drilling head 3 can be evacuated from the drilled hole.

A longitudinal slot 12 provided in the bearing head 10 enables expansion of the bearing ring 10 and its contraction when it is mounted on the drill shaft. The bearing ring 10 can be mounted on the untempered drill shaft 1 first and then tempered together with the drill shaft 1.

The bearing ring 10 is a replaceable component. It is replaced when worn. The bearing ring 10 has better bearing properties during the pivoting operation than does the bulge portion 5 shown in FIG. 1.

FIG. 3 shows a further embodiment of a drilling apparatus according to the invention in which the stop ring 2 is formed by a stop flange 13 of a sleeve 14. The sleeve 14 has a longitudinal slot 15 and is mounted between a convex collar 16 and a shaft shoulder 17. The shaft shoulder 17 narrows in the direction of the drilling head 3 with the result that the shaft portion 1b between the shaft shoulder 17 and the drilling head 3 limits the pivotal movement during the making of the undercut 6 (FIG. 1) in a defined manner.

While the invention has been illustrated and described as embodied in a drilling apparatus for drilling holes with an undercut, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

I claim:

1. A drilling apparatus for producing drilled holes having an undercut, said apparatus comprising a drilling tool to be inserted into a drilling machine and including a drill shaft having a free end; a drilling head with a drilling plate located on said free end of said drill shaft; and a stop ring having a form of an annular disc and mounted on said drill shaft; said drill shaft having, in a region between said stop ring and said drilling head, a bulge portion, first and second portions extending from said bulge portion to said stop ring and said drilling head, respectively, and having a maximum diameter which is less than a maximum diameter of said bulge portion, at least one of said first and second portions having a tapered surface, and grooves for drilling dust extending through said stop ring.

2. A drilling apparatus according to claim 1, wherein said bulge portion has a cylindrical configuration.

3. A drilling apparatus according to claim 1, wherein said drill shaft has an annular groove, said apparatus further comprising a ring spring located in said annular groove and engaging said stop ring for retaining said stop ring.

4. A drilling apparatus according to claim 1, wherein said stop ring is rigidly mounted on said drill shaft, said drilling dust grooves ending in said stop ring.

5. A drilling apparatus according to claim 1, wherein said bulge portion has a central portion with a diameter which is less than the maximum diameter of said bulge portion, said appartus further comprising a bearing ring surrounding said drill shaft and mounted on said central portion of said bulge portion.

6. A drilling apparatus according to claim 5, wherein said bearing ring has a longitudinal slot.

7. A drilling apparatus according to claim 5, wherein said central portion has a lesser depth than said drilling grooves.

8. A drilling apparatus according to claim 1, wherein said drill shaft has a shank portion to be received in the drilling machine, and, in the region between said bulge portion and said shank, a convex collar over which said drilling dust grooves pass, and which has a side directed to said drilling head, said drilling apparatus further comprising a split sleeve engaging said side of said convex collar, serving as a centering sleeve and having a stop flange resting against said convex collar and defining said stop ring.

9. A drilling apparatus according to claim 8, wherein said drill shaft has a shaft shoulder spaced from said convex for retaining said split sleeve between said convex collar and said shaft shoulder.

10. A drilling apparatus according to claim 9, wherein said drill shaft tapers from said shaft shoulder towards said drilling head.

* * * * *